Nov. 11, 1969 C. J. DAWES 3,478,190

PARALLEL-GAP WELDING ELECTRODE WITH INTERPOSED HEAT SINKS

Filed June 27, 1966 2 Sheets-Sheet 1

Inventor
Christopher J. Dawes
By Kemon, Palmer,
Stewart & Estabrook
Attorneys

Nov. 11, 1969 C. J. DAWES 3,478,190

PARALLEL-GAP WELDING ELECTRODE WITH INTERPOSED HEAT SINKS

Filed June 27, 1966 2 Sheets-Sheet 2

Inventor
Christopher J. Dawes
By Kenyon Palmer
Stewart & Estabrook
Attorneys

United States Patent Office 3,478,190

Patented Nov. 11, 1969

3,478,190

PARALLEL-GAP WELDING ELECTRODE WITH INTERPOSED HEAT SINKS

Christopher J. Dawes, Abington Hall, Cambridge, England, assignor to British Welding Research Association, London, England, a body corporation of Great Britain Filed June 27, 1966, Ser. No. 560,445

Claims priority, application Great Britain, June 29, 1965, 27,561/65

Int. Cl. B23k 9/28, 11/10

U.S. Cl. 219—86 5 Claims

ABSTRACT OF THE DISCLOSURE

An electrode assembly for parallel-gap welding is disclosed in which the electrodes are separated by a heat sink member positioned to contact the workpieces together with the electrodes.

Figure 1:
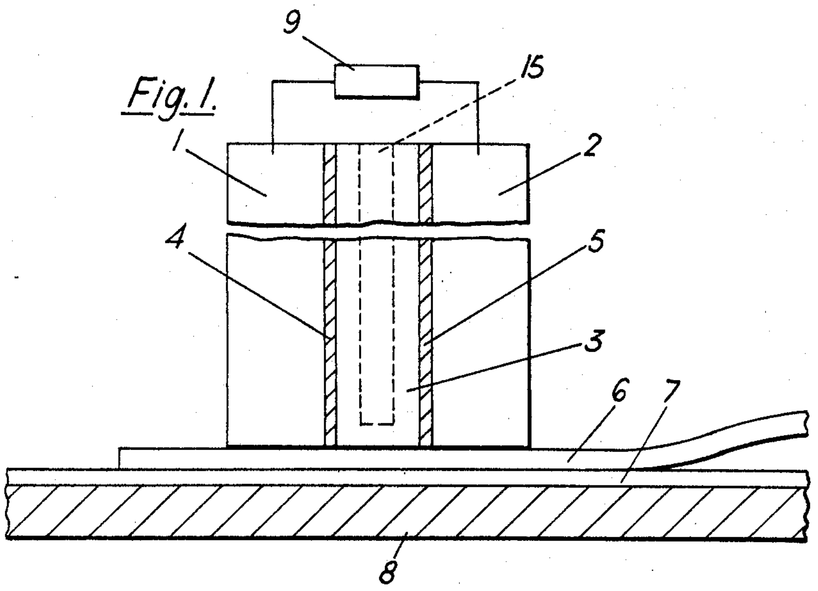

One method used to join leads from electronic components to printed circuit boards is a form of resistance welding known as parallel-gap joining, the joining being by welding, brazing or soldering. The process is also used for joining leads to thin films on glass or ceramic substrate. The term "parallel-gap" means that two electrodes are placed on the same side of the lead and current flows from one electrode to the other through the lead and underlying metal. Two conventional types of electrode are used for the process: in one type the electrodes are bonded to a dielectric giving a solid composite electrode (or fixed electrode) and in the other they are mounted independently and separated by an air gap. In the latter arrangement the electrodes are usually permitted to adjust themselves to unevenness in the underlying lead, the ability to move in this way being known as compliance. The gap between the electrodes depends on the nature and thickness of the two materials being joined, but is generally within the range from 0.002" to 0.020". Large gaps are frequently used where a braze joint has to be made.

As the current flows between the electrodes the upper lead and the underlying lead or circuit are heated and a joint is formed, but as a consequence of the geometry of the assembly the region between the electrodes becomes hotter than the regions under the electrodes; the electrodes are usually of copper or copper alloy and act as heat sinks. The lead or circuit can overheat and in some cases melts and may be permanently damaged. Overheating of the lead also accelerates electrode wear. In addition, with the fixed electrode, overheating leads to erosion of the dielectric.

According to the present invention, the temperature distribution is rendered more uniform by placing a heat sink in contact with the upper strip between the points at which the electrodes contact this strip. This heat sink may advantageously take the form of a third metallic member mounted between the two electrodes, but insulated from these electrodes. It has the advantage of removing most heat from the metallic strips at points where these strips reach the highest temperature and thus tends to even out the temperature distribution between the electrodes, as well as compensating, in the region between the electrodes, for the action of the electrodes themselves as heat sinks for the material immediately underneath these electrodes.

In addition to ensuring a more uniform temperature distribution, the intermediate heat sink applies pressure to the region between the two electrodes. As a result of this a wider area of joint is obtained, with reduced porosity in the joint, and overheating of the substrate is greatly reduced. This reduces the likelihood of breakdown of the organic base which normally contaminates the electrodes and necessitates frequent cleaning. It also reduces the thermal shock applied to glass or ceramic substrates. Furthermore, with the known methods of parallel gap welding, there is a tendency for the upper metal strip to expand away from the lower metal strip and thus to reduce the chance of a successful joint. It was particularly difficult to make consistent parallel-gap welds when the lower metal was copper, for example, as in printed circuit boards. The advantages of the present invention are particularly important with copper printed circuit boards which were thus difficult to join with conventional techniques without the risk of damage to the circuit track and substrate, or rapid deterioration of the electrodes. The ability to join leads to copper printed circuit boards with consistency, would avoid the need to use special circuit boards using materials other than copper which are more expensive and present problems of material specification (grade and tolerance.)

If desired, a temperature or voltage sensing element may be mounted in the heat sink between the electrodes to provide an indication of the temperature in the central region and, therefore, of the quality of the joint.

In order that the invention may be better understood, some examples will not be described with reference to FIGURES 1, 2 and 3 of the accompanying drawings which are respectively a diagrammatic illustration of the method embodying the invention, an illustration of an electrode system mounted in a holder, and a diagram illustrating a modified form of the electrode assembly.

In FIGURE 1, the composite welding device comprises two electrodes 1 and 2 separated by a heat sink 3, each electrode being insulated from the heat sink by an insulating layer 4 or 5. The electrode assembly rests on a lead 6 from an electronic component which is to be joined to an underlying strip 7 mounted on an insulating base 8. The electrodes 1 and 2 are electrically connected to opposides of a power source 9 and the current flow between the electrodes is represented diagrammatically by the dotted line which joins them through the components 6 and 7 to be joined. The power source may be a battery, an alternating current supply, or a bank of capacitors.

The parallel-gap welding assembly shown in FIGURE 1 may be made with three sheets of copper alloy bonded together with two layers of adhesive-impregnated tissue which forms the dielectric or insulator. The central heat sink can alternatively be of any other metal having good heat conducting properties, for example, silver, tungsten or molybdenum.

Figure 2:
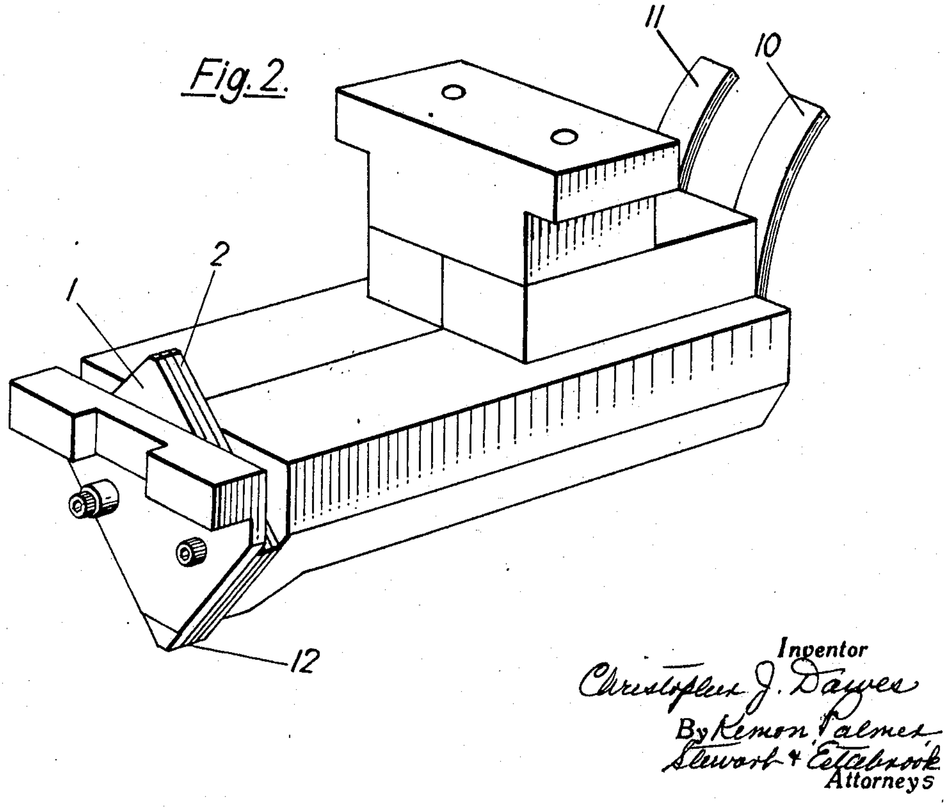

FIGURE 2 shows a typical holder for the composite electrode which enables it to be mounted in a conventional parallel-gap joining equipment. Current leads 10 and 11 supply current to the front and rear components 1 and 2 of the composite electrode assembly. In this particular arrangement, the electrodes are plates extending perpendicularly to the plane of FIGURE 1 and they are arranged to present a corner 12 to the work assembly. This facilitates alignment of the assembly with the lead and circuit track. The four corners of the electrode assembly provide four possible welding faces, each of which can be reground or cleaned when the electrodes deteriorate.

Figure 3:
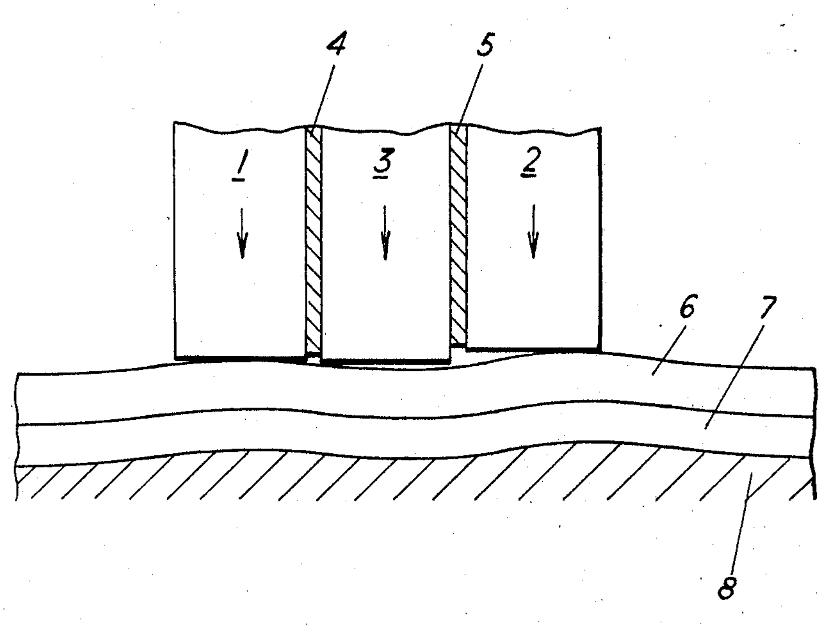

The adhesive-impregnated dielectric 4 and 5 of FIGURE 1 may be replaced with an unbonded film so that the two electrodes and the intermediate heat sink can move independently to adjust the variations in the surface height of the lead, as illustrated in FIGURE 3, or air gaps may exist between each electrode and the heat sink 3. This "compliance" is advantageous with circuit boards which are not flat or which distort when the electric load is applied. In another alternative the dielectric is bonded to the metallic insert so that it can move independently of the two electrodes. The force applied to the insert is then independent of that applied to the electrodes.

As stated above, a temperature sensing element, e.g., thermocouple, or thin film heat sensor, may be incorporated in the metallic insert so that the rise in temperature during the welding process can be used as a means of indicating or correcting weld quality. This insert is represented by the element 15 of FIGURE 1. Alternatively, the insert may be used to measure voltage or the resistance of the workpiece or (with the compliant form) to measure expansion during the formation of the joint.

The main advantage of the use of this invention is to extend the use of parallel-gap joining so that higher quality joints can be achieved with greater consistency. The use of the heat sink as a mounting for a sensing element provides opportunities for quality indication and correction. The temperature achieved is to some extent a guide to weld quality, since excess temperature will damage the parts to be welded and a low temperature will lead to an unreliable joint. The sensing element may be a pyrometer connected to a control circuit which may, on receipt of an indication of incorrect temperature, adjust the energy input for subsequent welds; or, in the case of an insufficient energy input for a given weld, may cause a second current pulse to be applied to the same weld.

I claim:

1. An electrode assembly for parallel-gap welding comprising:

a heat sink of high thermal conductivity mounted between said electrodes so that when said electrodes rest on the upper of two superposed parts to be welded, said heat sink contacts said upper part between said electrodes, the transverse dimension of said heat sink between said electrodes being less than about .025 inch.

2. An electrode assembly in accordance with claim 1 in which said heat silnk is bonded to said electrodes by an insulating adhesive.

3. An electrode assembly in accordance with claim 1 in which said heat sink is mounted so as to be moved with respect to at least one of said electrodes, in a direction towards or away from the workpiece.

4. An electrode assembly in accordance with claim 1 including a holder for said electrodes and in which said electrodes are plate members, each plate member having at least one corner in its periphery, said plate members being mounted in said holder so that said corners are downwardly directed for contact with the workpiece.

5. An electrode assembly in accordance with claim 1 including a sensing element mounted in said heat sink, said sensing element having an output which is proportional to a physical property of the weld.

References Cited

UNITED STATES PATENTS

| | | | |
|---|---|---|---|
| 3,234,354 | 2/1966 | Penberg | 219—86 |
| 3,284,606 | 11/1966 | Schroeppel | 219—86 |

JOSEPH V. TRUHE, Primary Examiner

L. H. BENDER, Assistant Examiner

U.S. Cl. X.R.

19—87